United States Patent [19]

Kemplin et al.

[11] 4,135,245
[45] Jan. 16, 1979

[54] PLOTTER WITH AUTOMATIC PEN-CHANGER

[75] Inventors: Richard M. Kemplin, Poway; Richard N. Tverdoch, Solana Beach; Larry W. Hennessee, San Diego, all of Calif.

[73] Assignee: Hewlett-Packard Company, Palo Alto, Calif.

[21] Appl. No.: 756,680

[22] Filed: Jan. 4, 1977

[51] Int. Cl.² ............................................. G06F 15/46
[52] U.S. Cl. ..................................... 364/520; 29/568; 346/139 R
[58] Field of Search ................. 29/26 A, 568; 346/46, 346/29, 33 R, 48, 139 R; 235/151; 364/520

[56] References Cited

U.S. PATENT DOCUMENTS

| 2,674,513 | 4/1954 | Bowditch et al. ..................... 346/46 |
| 3,709,623 | 1/1973 | Stephan et al. ................. 29/26 A X |
| 3,744,124 | 7/1973 | Gardner ................................. 29/568 |
| 3,747,085 | 7/1973 | Bala et al. ............................ 408/6 X |

Primary Examiner—Charles E. Atkinson
Attorney, Agent, or Firm—Robert S. Hulse

[57] ABSTRACT

An X-Y plotter is provided having an automatic pen changer comprising a pen repository, a memory for storing data identifying a pen selected by a user, a plot head for automatically fetching pens from and depositing pens into the repository, a processing means having a routine stored in a read-only-memory for providing head-movement coordinates, and a control means for moving the head to said coordinates, the pen-changing action (fetching and depositing) being performed solely by movement of the head to said coordinates. Deposited pens are automatically capped to prevent drying-out, fetched pens are automatically uncapped prior to use.

17 Claims, 12 Drawing Figures

PLOTTER WITH AUTOMATIC PEN-CHANGER

BACKGROUND AND SUMMARY OF THE INVENTION

Present pen-changing mechanisms generally employ a device such as a turret for performing pen changing operations. Generally, the turret is rotated to permit the fetching and depositing of the pens. To perform the rotation, a motor, solenoid or other similar rotational device is usually employed. However, inclusion of such rotational devices in a plotter or other apparatus adds undesirable weight, mass and inertia to such apparatus. Also, the pens in the turret often tend to dry out as a result of exposure to air. What is needed and desirable, therefore, is an apparatus that performs pen changing without the need for special pen-changing motors, solenoids, turrets and the like, and that prevents drying of the writing tips of the pens.

Thus, according to the illustrated preferred embodiment of the present invention, an automatic pen-changing apparatus is provided, in an X-Y plotter system, which utilizes the motors that drive the head (i.e., the motors that ordinarily move the head to position coordinates) to also perform pen-changing operations and to uncap and cap the pens before and after use, respectively. This obviates the need for turrets and the like and for pen-changing motors or solenoids for operating the turrets.

The apparatus includes a plot head capable of fetching, holding and depositing a pen, a pen repository having stations for storing, capping and uncapping pens and for detecting the status ("unoccupied" or "occupied" by one or more pens) of the plot head and of the stations, a memory for storing user-supplied pen-identifying data, a processing means for providing position coordinates corresponding to an unoccupied station and to the station identified by the user-supplied data, and a control means for moving the plot head to the position coordinates, the movement to said coordinates causing the plot head to deposit its pen into the unoccupied station and to fetch a pen from the station corresponding to the user-supplied data.

DESCRIPTION OF THE PREFERRED EMBODIMENT

Figure 1:
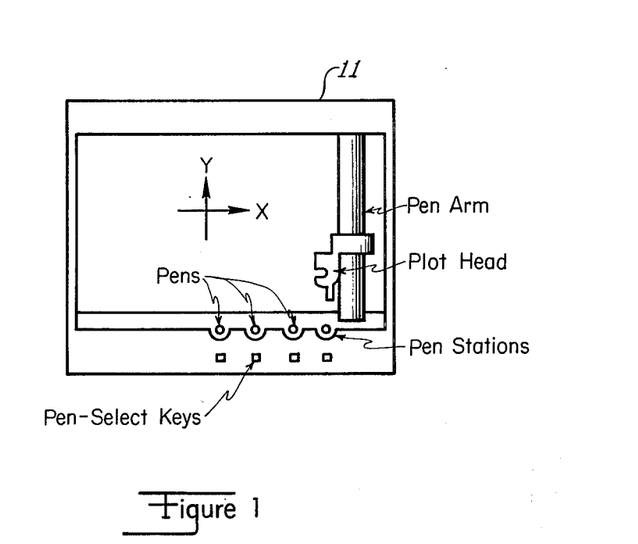
FIG. 1 is a diagrammatic illustration of the plotter of the present invention.
Figure 2:
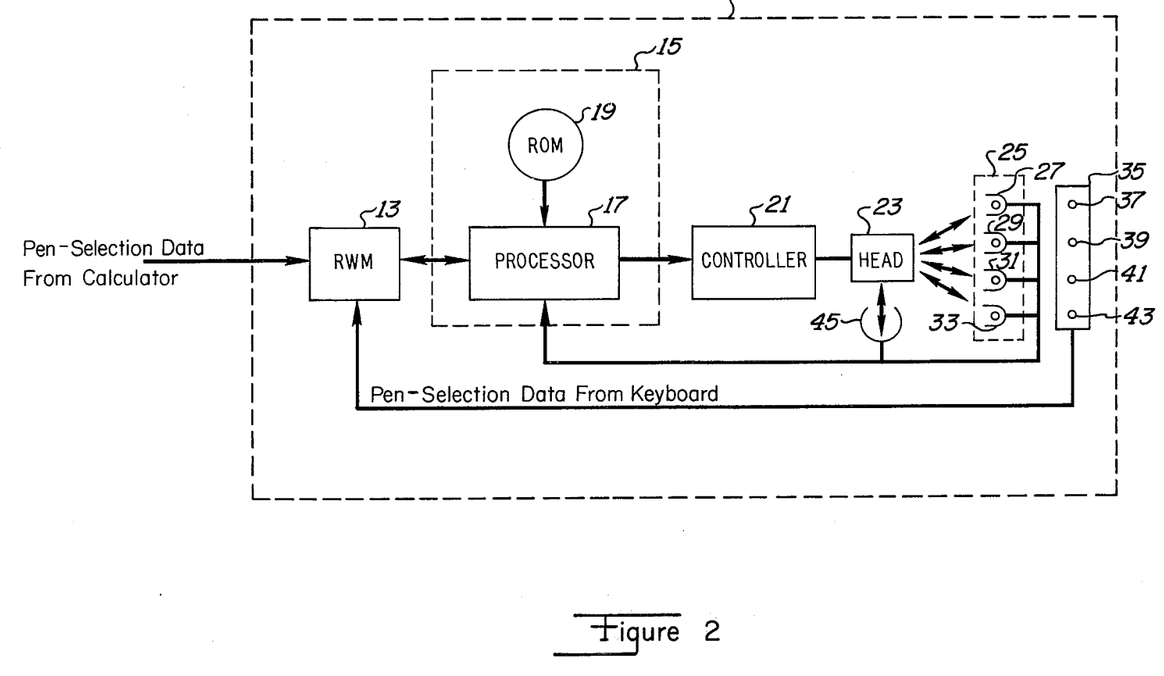
FIG. 2 is a block diagram showing operative elements of the plotter of FIG. 1.
Figure 3:
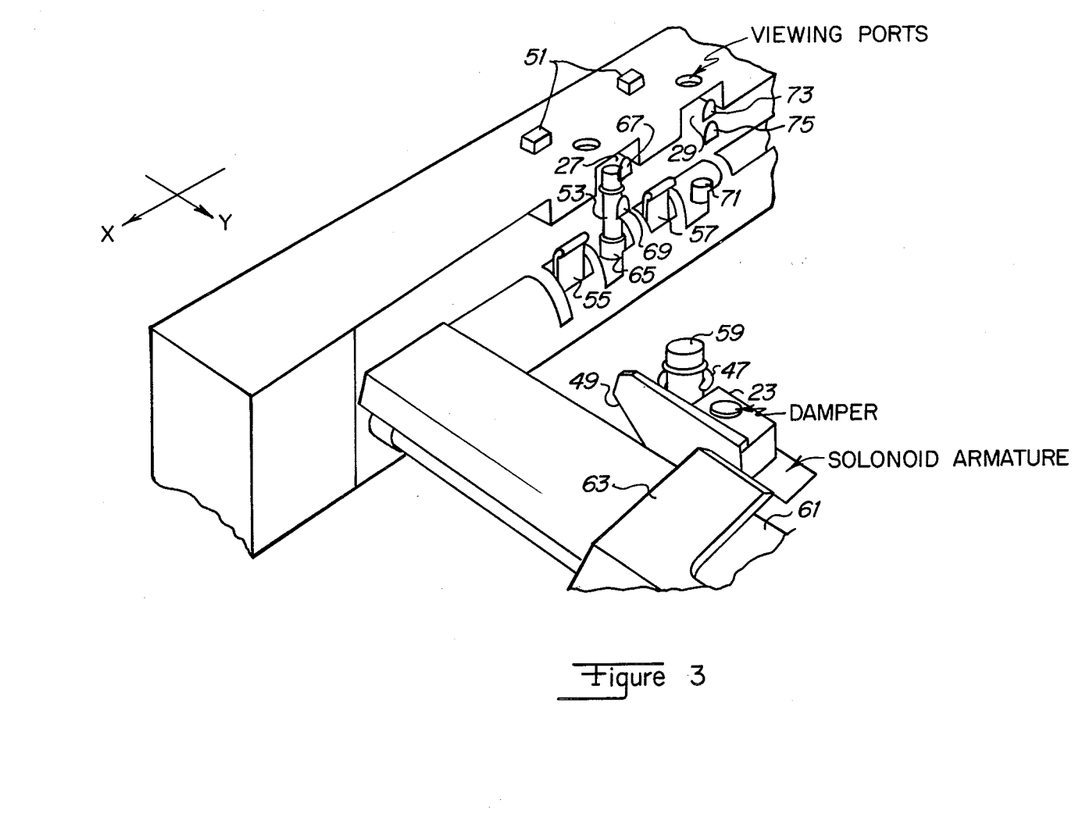
FIG. 3 is an auxiliary view of the plot head and selected stations of the plotter of FIG. 1.
Figure 4:
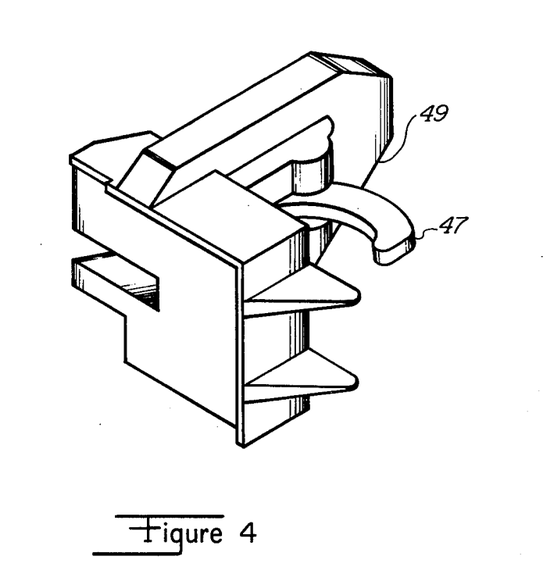
FIG. 4 is an auxiliary view of selected portions of the plot head of FIG. 3.

FIG. 1 shows an X-Y plotter system 11 of the present invention. FIG. 2 shows the elements of this system in block diagram form. The system 11 includes a read-write memory (RWM) 13, a stable or repository 25 with four stations (slots) 27, 29, 31, 33 located adjacent to the plotting surface for storing pens therein, each station being equipped with sensors for detecting its status (unoccupied or occupied), and a keyboard 35 with four keys 37, 39, 41, 43 for manual entry of data into the system. Data may also be entered automatically from a calculator or similar device interfaced to the system. The entered data identifies a station in the repository 25, permitting the selection or fetching of the pen in that station for use in producing a plot. The pen-storage stations 27, 29, 31, 33 each contain one pen with ink of a desired color; selection of different stations, therefore, permits the plotting of data in selected colors. Also included in system 11 is a processor 17, a read-only-memory (ROM) 19 with a routine stored therein, a pen-detector station 45, a plot head 23 and a controller 21 for controlling the movement of plot head 23. FIG. 3 shows plot head 23 and stations 27 and 29 in greater detail. FIG. 4 shows a hinged, spring-loaded pen-holding portion 47 and ramp portion 49 of plot head 23.

In fetching a pen from a selected station, plot head 23 is first moved from the position it occupies, for example, from an initial position represented by coordinate pairs $(X_0, Y_0)$, to a position $(X_1, Y_1)$ in front of the selected station. From position $(X_1, Y_1)$, the head 23 is then moved to position $(X_4, Y_4)$ in a U-shaped pattern as shown in FIG. 5A for fetching a pen from the selected station.

Figure 5A:
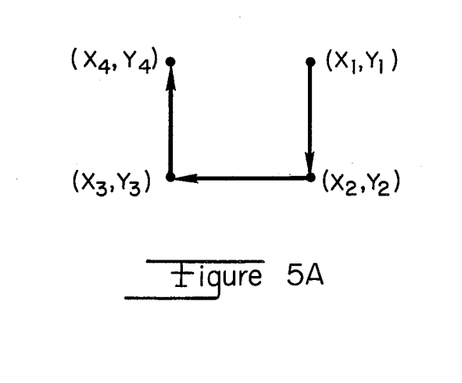
FIGS. 5A-B are diagrammatic illustrations of patterns of movements of the plot head of FIG. 3 in performing pen-fetching and pen-depositing operations, respectively.
Figure 6A:
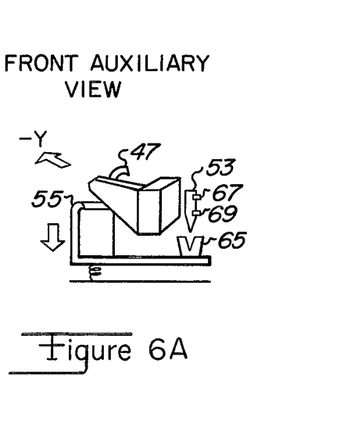
FIGS. 6A-C are diagrammatic illustrations of engagement of the plot head with a station of FIG. 3, in fetching a pen from the station.
Figure 6B:
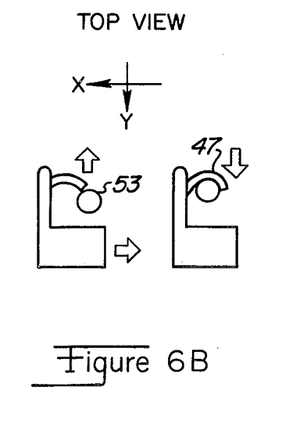
Figure 6C:
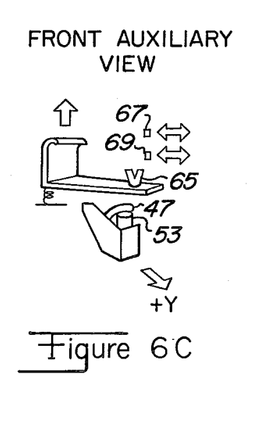

To fetch a pen from station 27, (FIG. 3), e.g., plot head 23 is moved into the station from position $(X_1, Y_1)$ to position $(X_2, Y_2)$ as shown in FIGS. 5A and 6A, with the ramp portion 49 of plot head 23 engaging lever 55 and depressing the lever. Since lever 55 is connected to a pen cap 65 as shown in FIG. 6A, depression of lever 55 causes the pen cap 65 to be moved down and away from pen 53 which is held stationary in the station by holders 67 and 69. Depression of lever 55 therefore causes pen 53 in station 27 to become uncapped. As shown in FIG. 5A, plot head 23 is then moved laterally from position $(X_2, Y_2)$ to position $(X_3, Y_3)$ within the station. As shown in FIG. 6B, this lateral movement causes the spring-loaded pen-holding portion 47 to come into contact with the pen 53 and to contiguously advance around said pen 53, thereby partially encircling and holding the pen 53. After encircling and holding the pen, head 23 is moved from position $(X_3, Y_3)$ to position $(X_4, Y_4)$, withdrawing the the pen from the station. This pen-withdrawal movement causes spring-loaded pen holders 67, 69 to move (in opposition to its own spring tension) from the path of the withdrawn pen as shown in FIG. 6C, thereby causing station 27 to release the pen 53. The movement of head 23 from position $(X_3, Y_3)$ to position $(X_4, Y_4)$ also permits ramp 49 to become disengaged from lever 55 thereby causing lever 55 and cap 65 to return to its original position. From position $(X_4, Y_4)$, head 23 is moved to its original position $(X_0, Y_0)$.

Figure 5B:
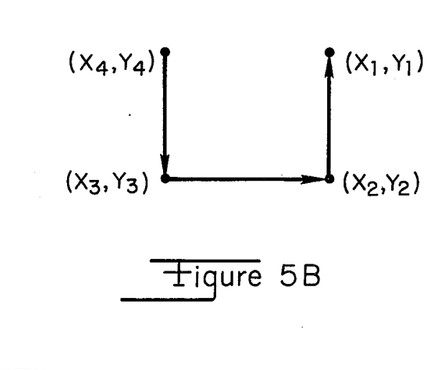
Figure 7A:
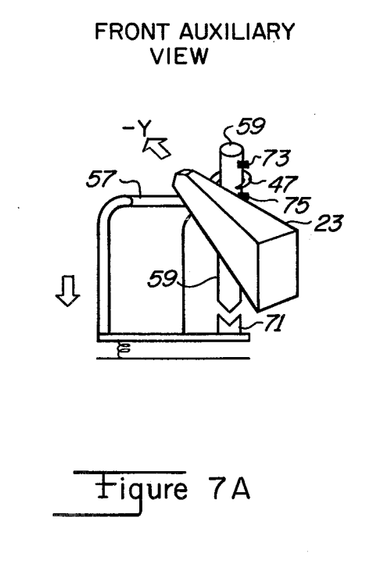
FIGS. 7A-C are diagrammatic illustrations of engagement of the plot head with a station of FIG. 3, in depositing a pen into the station.
Figure 7B:
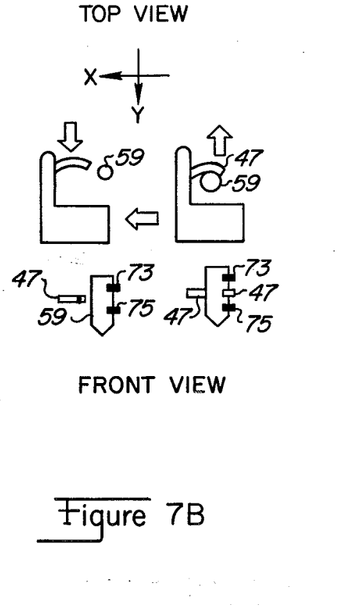
Figure 7C:
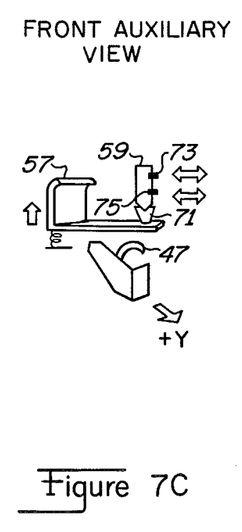

Often, to change a pen held by plot head 23, it becomes necessary for the head 23 to deposit the pen into an available (unoccupied) station before fetching another pen from a selected station. In depositing a pen into an available station, plot head 23 is moved from a current position $(X_0, Y_0)$ to a position $(X_4, Y_4)$ in front of the available station. From position $(X_4, Y_4)$, head 23 is then moved to position $(X_1, Y_1)$ in a U-shaped pattern as shown in FIG. 5B (the depositing operation being essentially a reverse of the fetching operation). In moving from position $(X_4, Y_4)$ to position $(X_3, Y_3)$ to deposit a pen into the available station, for example to deposit pen 59 into station 29 as shown in FIG. 3, the ramp portion 49 of plot head 23 engages lever 55 and depresses the lever causing pen cap 71, FIG. 7A to be moved down in preparation for deposit (insertion) of pen 59 into the station 29. Deposit of pen 59 into the station is accomplished by movement of the pen 59 past pen holders 73, 75. As the pen 59 travels from position $(X_4, Y_4)$ to position $(X_3, Y_3)$ within the station 29, it comes into contact with the holders 73, 75 and is moved contiguously past them; this causes the holders 73, 75, which are spring-loaded, to first recede from the path of the pen 59 then snap back, partially encircling the pen 59 and holding it in place in the station 29. From position $(X_3, Y_3)$, as shown in FIG. 5B, plot head 23 is then moved laterally to position $(X_2, Y_2)$. This lateral movement causes the spring-loaded pen-holding portion 47 to move contiguously around and away from pen 59, thereby releasing the pen 59 as shown in FIG. 7B. From position $(X_2, Y_2)$, the head 23 is then moved to position $(X_1, Y_1)$, causing ramp 49 to become disengaged from lever 57 and cap 77 to return to its original position, thereby capping the pen 59. After pen 59 has been capped, plot head 23 is then moved from position $(X_1, Y_1)$ to its initial position $(X_0, Y_0)$, thereby completing the deposit operation.

Referring now to FIG. 2, data may be entered into read-write memory (RWM) 13 of the system 11 from a data apparatus such as a calculator or from keyboard 35. Data entered from a calculator may be of the form "SPn", wherein "SP" represents a "select-pen" command and "n" represents an integer 1-4 identifying the station containing the pen to be fetched (selected), or an integer 0 indicating that no pen is to be fetched, but that the pen, if any, contained in plot head 23 is to be deposited into an unoccupied station. Alternatively, when keys 37, 39, 41, 43 of keyboard 35 are pressed, a digital signal value "n" is entered into RWM 13 identifying one of the pen-storage stations 27, 29, 31, 33, respectively, as the station containing the pen to be fetched. This data or command entered into RWM 13 is then processed by processor 17, under control of the routine stored in ROM 19, to produce position coordinates to which controller 21 moves plot head 23 in order to fetch the pen from station n. Prior to the fetching action, if a pen-storage station is unoccupied, the processor 17 causes controller 21 to deposit the pen contained in the head into the unoccupied station prior to fetching the pen contained in station n. These depositing and fetching operations, which are performed under control of the routine stored in ROM 19, are described below and shown in flow chart (logic flow diagram) form in FIGS. 8A and 8B. A list of the instructions of which the routine is comprised is shown in Table 1 following. The routine is entered, starting at block 81, each time data or command is entered into RWM 13.

Figure 8A:
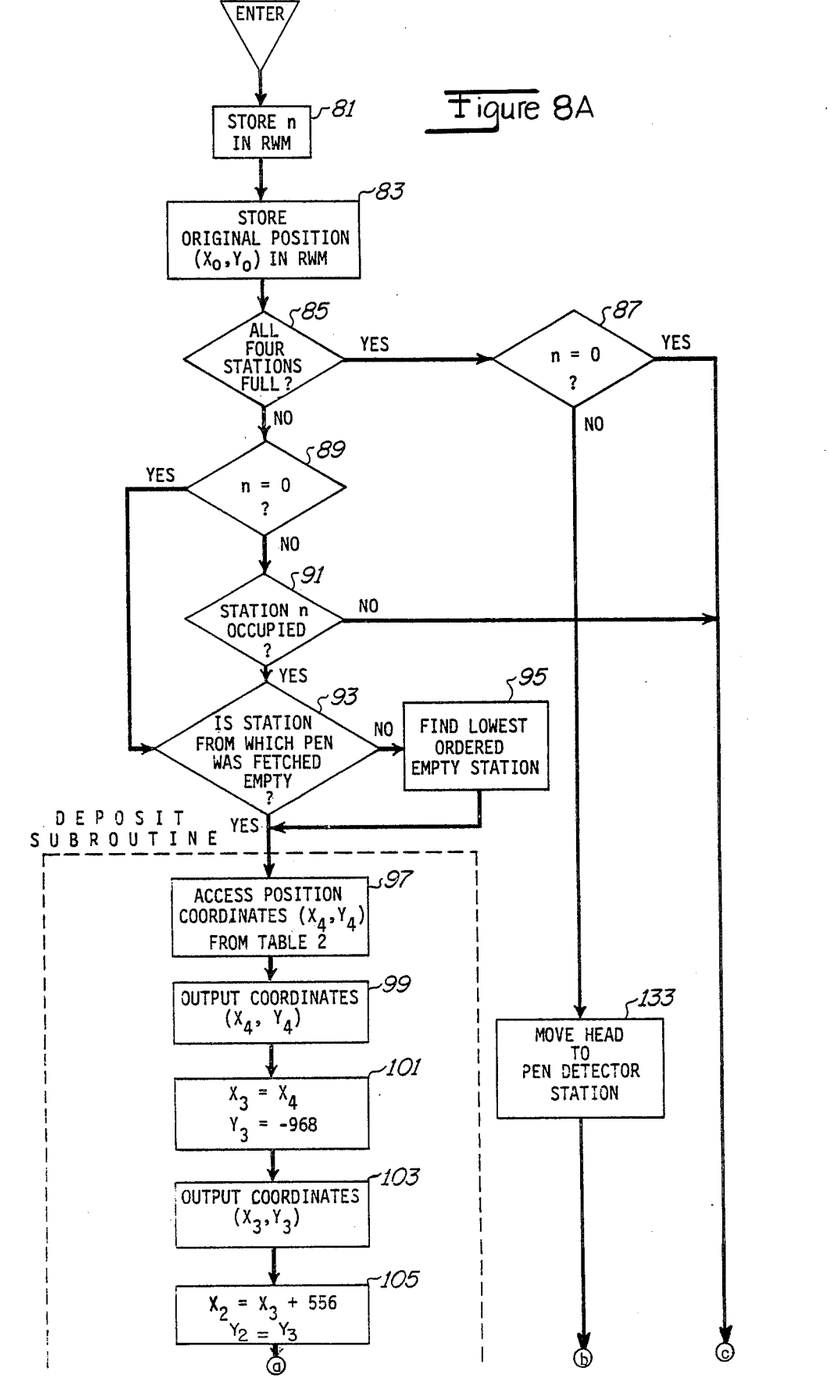
FIGS. 8A and 8B are logic flow diagrams of a routine stored in the plotter of FIG. 2 for generating position coordinates to which the plot head is moved.

At block 81, the integer n representing a selected station is stored in RWM 13, after which, the present or current position $(X_0, Y_0)$ of plot head 23 is stored in RWM 13, as indicated by block 83. From block 83, control is transferred to block 85 where a test is made, utilizing sensors contained in pen-storage stations 27, 29, 31, 33, to determine if all four of the pen-storage stations 27, 29, 31, 33 are full (each occupied by a pen). If all four stations are full, control is transferred from block 85 to block 87 where a further test is made to determine if the data "n" entered into RWM 13 is zero or non-zero. If n is found to be zero, no fetch operation is performed; in which case, an exit is made from the routine because no deposit can be performed either, since all the stations are full (as was determined at block 85). If all four stations are not full (i.e., at least one station is unoccupied), control is transferred from block 85 to block 89 where another test is made to determine if n is zero or non-zero. As block 89 shows, if "n" is non-zero, this indicates that a pen is to be fetched from station n, and control is transferred to block 91; if, however, n is zero, this indicates that no pen is to be fetched, and that the pen in plot head 23 is to be deposited into an available station, in which case control is transferred to block 93.

Table 1

| Sequence No. | ROM Address (Octal) | Object Code (Octal) | Label | Program Instruction | Remarks |
|---|---|---|---|---|---|
| 1975** | INSTR TO SELECT PEN | | | SP,P | |
| 1977* | | | | | |
| 1978 | 44131 | | SP | EQU * | |
| 1979 | 44131 | 004226 | | LDB 00 | |
| 1980 | 44132 | 001445 | | LDA EORFG | |
| 1981 | 44133 | 072006 | | RZA SPFP | |
| 1982 | 44134 | 004172 | | LDB 01 | PASSN |
| 1983 | 44135 | 040402 | | JSM ONEGT | GET PEN # |
| 1984 | 44136 | 172466 | | SAM GOER3 | ERROR IF <0 |
| 1985 | 44137 | 020222 | | ADA N5 | |
| 1986 | 44140 | 172064 | | SAP GOER3 | ERROR IF >4 |
| 1987* | | | | | |
| 1988 | 44141 | 035570 | SPFP | STB PENNU | SAVE PEN # |
| 1989 | 44142 | 040513 | | JSM WT4SV | |
| 1990 | 44143 | 001406 | | LDA XPRES | SAVE |
| 1991 | 44144 | 031565 | | STA SAVEX | CURRENT |
| 1992 | 44145 | 001407 | | LDA YPRES | SERVO |
| 1993 | 44146 | 061666 | | STA SAVEY | POSITION |
| 1994 | 44147 | 001602 | | LDA OTWD | & PEN |
| 1995 | 44150 | 031567 | | STA SAVEP | VALUES |
| 1996* | | | | | |
| 1997 | 44151 | 000016 | | LDA STABL | GET CURRENT |
| 1998 | 44152 | 170400 | | AAR 1 | STABLE |
| 1999 | 44153 | 050231 | | AND 017 | STATUS |
| 2000 | 44154 | 010231 | | CPA 017 | FULL HOUSE? |
| 2001 | 44155 | 067227 | | JMP FULL | YES |
| 2002 | 44156 | 076403 | | SZB STALL | IF 0 PUT PEN INTO STABLE |

Table 1-continued

| Sequence No. | ROM Address (Octal) | Object Code (Octal) | Label | Program Instruction | Remarks |
|---|---|---|---|---|---|
| 2003 | 44157 | 043267 | | JSM SPSUB | TEST STALL STATUS |
| 2004 | 44160 | 072450 | | SZA GOIDL | NO PEN - IGNORE |
| 2005* | | | | | |
| 2006 | 44161 | 005554 | STALL | LDB CURPN | GET CURRENT PEN: 1,2,3,4 |
| 2007 | 44162 | 043267 | | JSM SPSUB | TEST STALL STATUS |
| 2008 | 44163 | 372003 | | RZA LOW | NO - GO FIND LOWEST EMPTY |
| 2009 | 44164 | 005654 | | LDB CURPN | YES - PUT PEN |
| 2010 | 44165 | 067173 | | JMP PUT | BACK THERE |
| 2011* | | | | | |
| 2012 | 44166 | 004226 | LOW | LDB O0 | RETURN |
| 2013 | 44167 | 000015 | | LDA STABL | PEN TO |
| 2014 | 44170 | 024172 | | ADB 01 | LOWEST |
| 2015 | 44171 | 170400 | | AAR 1 | EMPTY |
| 2016 | 44172 | 073476 | | RLA *−2 | STALL |
| 2017* | | | | | |
| 2018 | 44173 | 027323 | PUT | ADB ADXLP | 8 HAS STALL # |
| 2019 | 44174 | 100001 | | LDA B,I | |
| 2020 | 44175 | 043277 | | JSM FOOLY | |
| 2021 | 44176 | 001012 | | LDA PXREL | |
| 022 | 44177 | 004226 | | LDB O0 | |
| 2023 | 44200 | 177601 | | SEC *+1,S | |
| 2024 | 44201 | 043255 | | JSM MOSEY | |
| 2025 | 44202 | 043312 | | JSM FIXY0 | |
| 2026 | 44203 | 005670 | GET | LDB PENNU | PUT PEN ONLY? |
| 2027 | 44204 | 076421 | | SZB DONE | IF YES MOVE SERVO BACK |
| 2028* | | | | | |
| 2029 | 44205 | 027623 | | ADB ADXLP | B HAS STALL # |
| 2030 | 44206 | 100001 | | LDA B,I | |
| 2031 | 44207 | 021012 | | ADA PXREL | |
| 2032 | 44210 | 043277 | | JSM FOOLY | |
| 2033 | 44211 | 001012 | | LDA PXREL | |
| 2034 | 44212 | 170040 | | TCA | |
| 2035 | 44213 | 004226 | | LDB O0 | |
| 2036 | 44214 | 17/301 | | SEC *+1,S | |
| 2037 | 44215 | 043255 | | JSM MOSEY | |
| 2038 | 44216 | 043312 | | JSM FIXY0 | |
| 2039 | 44217 | 040513 | | JSM WT4SV | |
| 2040 | 44220 | 005570 | | LDB PENNU | UPDATE |
| 2041 | 44221 | 035554 | | STB CURPN | CURRENT PEN |
| 2042 | 44222 | 043267 | | JSM SPSUB | TEST STALL STATUS |
| 2043 | 44223 | 072402 | | SZA *+2 | SELECTED STALL EMPTY? |
| 2044 | 44224 | 154336 | | JMP POWAD,I | (NO - FATAL PICK FAILURE!!!) |
| 2045 | 44225 | 043241 | DONE | JSM FIXUP | RETURN TO STATUS QUO |
| 2046 | 44226 | 064370 | | JMP IDLE | |
| 2047* | | | | | |
| 2048 | 44227 | 076477 | FULL | SZB *−1 | IF PUT ONLY IGNORE |
| 2049 | 44230 | 001000 | | LDA XMAX | MOVE SERVO |
| 2050 | 44231 | 043277 | | JSM FOOLY | TO SENSOR |
| 2051 | 44232 | 040513 | | JSM WT4SV | |
| 2052 | 44233 | 000016 | | LDA STABL | LOOK AT SWITCH |
| 2053 | 44234 | 031575 | | STA CRIMP | SAVE IT |
| 2054 | 44235 | 043312 | | JSM FIXY0 | |
| 2055 | 44236 | 001575 | | LDA CRIMP | |
| 2056 | 44237 | 073466 | | RLA DONE | PEN IN ARM? |
| 2057 | 44240 | 067203 | | JMP GET | NO - SO GET ONE |
| 2058* | | | | | |
| 2059 | 44241 | | FIXUP | EQU * | |
| 2060 | 44241 | 001565 | | LDA SAVEX | RETURN TO |
| 2061 | 44242 | 005566 | | LDB SAVEY | POSITION BEFORE |
| 2062 | 44243 | 177201 | | SEC *+1,C | PEN |
| 2063 | 44244 | 043255 | | JSM MOSEY | SELECT |
| 2064 | 44245 | 001567 | | LDA SAVEP | RESET |
| 2065 | 44246 | 020172 | | ADA 01 | PEN |
| 2066 | 44247 | 050172 | | AND 01 | UP |
| 2067 | 44250 | 031510 | | STA WDPCT | OR |
| 2068 | 44251 | 140315 | | JSM MOVEP,I | DOWN |
| 2069 | 44252 | 000226 | | LDA O0 | RESET MODE |
| 2070 | 44253 | 031511 | | STA WDMOD | TO ABSOLUTE |
| 2071 | 44254 | 170201 | | RET 1 | |
| 2072* | | | | | |
| 2073 | 44255 | | MOSEY | EQU * | |
| 2074 | 44255 | 031506 | | STA WORDX | X MOVE |
| 2075 | 44256 | 035507 | | STB WORDY | Y MOVE |
| 2076 | 44257 | 000226 | | LDA O0 | |
| 2077 | 44260 | 177002 | | SEC *+2 | SET |
| 2078 | 44261 | 000172 | | LDA 01 | |
| 2079 | 44262 | 031511 | | STA WDMOD | MODE |
| 2080 | 44263 | 004172 | | LDB 01 | PEN |
| 2081 | 44264 | 035510 | | STB WDPCT | UP |
| 2082 | 44265 | 140314 | | JSM ADSET,1 | GO MOVE HARDWARE |
| 2083 | 44266 | 170201 | | RET 1 | |
| 2084* | | | | | |
| 2085 | 44267 | | SPSUB | EQU * | |
| 2086 | 44267 | 000016 | | LDA STABL | GET CURRENT STABLE STATUS |
| 2087 | 44270 | 170400 | | AAR 1 | |
| 2088 | 44271 | 014252 | | CPB 04 | COMPARE |
| 2089 | 44272 | 004227 | | LDB 010 | IT WITH |
| 2090 | 44273 | 014174 | | CPB 03 | SELECTED |
| 2091 | 44274 | 004252 | | LDB 04 | STALL |
| 2092 | 44275 | 050001 | | AND B | MASK |

Table 1-continued

| Sequence No. | ROM Address (Octal) | Object Code (Octal) | Label | Program Instruction | Remarks |
|---|---|---|---|---|---|
| 2093 | 44276 | 170201 | | RET 1 | |
| 2094* | | | | | |
| 2095 | 44277 | | FOOLY | EQU * | |
| 2096 | 44277 | 004226 | | LDB 00 | |
| 2097 | 44300 | 177201 | | SEC *+1, C | |
| 2098 | 44301 | 043255 | | JSM MOSEY | |
| 2099 | 44302 | 040513 | | JSM WT4SV | |
| 2100 | 44303 | 005013 | | LDB PYREL | |
| 2101 | 44304 | 035407 | | STB YPRES | |
| 2102 | 44305 | 174040 | | TCB | |
| 2103 | 44306 | 035564 | | STB PICK | |
| 2104 | 44307 | 177301 | | SEC *+1,S | |
| 2105 | 44310 | 043255 | | JSM MOSEY | |
| 2106 | 44311 | 170201 | | RET 1 | |
| 2107* | | | | | |
| 2108 | 44312 | | FIXY0 | EQU * | |
| 2109 | 44312 | 000226 | | LDA 00 | |
| 2110 | 44313 | 005013 | | LDB PYREL | |
| 2111 | 44314 | 177301 | | SEC *+1,S | |
| 2112 | 44315 | 043255 | | JSM MOSEY | |
| 2113 | 44316 | 005543 | | LDB SSTAT | |
| 2114 | 44317 | 076077 | | RZB *−1 | |
| 2115 | 44320 | 035564 | | STB PICK | |
| 2116 | 44321 | 035407 | | STB YPRES | |
| 2117 | 44322 | 170201 | | RET 1 | |
| 2118* | | | | | |
| 2120 | 44323 | 077013 | ADXLP | DEF XLPEN-1 | |
| 6396* | | | | | |
| 6397 | 77012 | 001054 | PXREL | DEC 556 | STABLE RELATIVE X TRAVEL |
| 6398 | 77013 | 001710 | PYREL | DEC 968 | STABLE RELATIVE Y TRAVEL |
| 6399* | | | | | |
| 6400 | 77014 | 023374 | XLPEN | DEC 9980 | X POSITION OF FOUR STALLS |
| 6401 | 77015 | 026474 | | DEC 11580 | |
| 6402 | 77016 | 031574 | | DEC 13180 | |
| 6403 | 77017 | 034674 | | DEC 14780 | |
| 6404* | | | | | |
| 6405 | 77020 | 000200 | DTP | OCT 200 | .5% TICK SIZE |
| 6406 | 77021 | 002000 | DLONG | OCT 2000 | 4% DASH LINE LENGTH |
| 6407* | | | | | |
| 6408 | 77022 | 000337 | DEMSK | DEC 223 | DEFAULT ERROR MASK |
| 6409 | 77023 | 000000 | DPMSK | DEC 0 | DEFAULT PARALLEL POLE MASK |
| 6410 | 77024 | 000000 | DSMSK | DEC 0 | DEFAULT SERIAL POLE MASK |
| 6411* | | | | | |
| 6412 | 77025 | 177754 | UP2DN | DEC −20 | INTER-MOVE DELAY IF PEN UP TO DOWN |
| 6413 | 77026 | 177766 | DN2UP | DEC −10 | INTER-MOVE DELAY IF PEN DOWN TO UP |
| 6414 | 77027 | 177766 | DN2DN | DEC −10 | INTER-MOVE DELAY IF PEN STAYS DOWN |

At block 91, a test is made to determine if the selected station, n, does in fact contain a pen. If station n does not contain a pen, then no pen can be fetched from the selected station, and an exit is made from the routine thereby causing the fetching operation to be ignored. If, on the other hand, station "n" does contain a pen, control is transferred to block 93.

At block 93, a test is made to determine the availability of the station from which the pen held by plot head 23 was fetched (the identity of this station is stored in RWM 13 at the time a pen is fetched from the station, as shown by block 81 described hereinbefore); if this station is not available (i.e., is not empty but occupied by another pen) for receiving a pen from plot head 23, control is transferred to block 95, otherwise, if this station is available (unoccupied) and can receive a pen from plot head 23, control is transferred to block 97. At block 95, each of the remaining stations are successively checked (for example, from lowest to highest order, in the sequence: first, second, third, fourth) to determine one that may be unoccupied. After an unoccupied station is found (sensed), control is transferred to block 97. At block 97, the position coordinates ($X_4$, $Y_4$) for commencing the depositing operation are accessed from a series of four position coordinate values stored in ROM 19. These position coordinate values for commencing depositing operations with respect to the four stations 27, 29, 31, 33 shown in FIG. 2, are listed in Table 2 below. For example, the coordinates ($X_4$, $Y_4$) to which plot head 23 must be moved when starting to deposit a pen into station 31 (the third station shown in FIG. 2) would be (13180,0). These coordinates correspond to those of the third station listed in Table 2.

Table 2

| Position Coordinates for Depositing a Pen | | |
|---|---|---|
| Station | $X_4$ | $Y_4$ |
| 1 | 9980 | 0 |
| 2 | 11580 | 0 |
| 3 | 13180 | 0 |
| 4 | 14780 | 0 |

Table 3

| Position Coordinates for Fetching a Pen | | |
|---|---|---|
| Selected Station | $X_1$ | $Y_1$ |
| 1 | 10536 | 0 |
| 2 | 12136 | 0 |
| 3 | 13736 | 0 |
| 4 | 15336 | 0 |

Following the operation at block 97, control is then transferred to block 99. As block 99 shows, these coordinates ($X_4$, $Y_4$) are then output or applied to controller 21 (FIG. 2) which moves plot head 23 to the desired coordinates ($X_4$, $Y_4$). (A controller or motor unit of this type is described, for example, in patent application entitled "Open-Loop Electric Drive With Corrective Controller", Ser. No. 756,679, filed Jan. 4, 1977 by Marvin LeRoy Patterson, Robert Dale Haselby and Albert Prall Kendig.) Thereafter, as FIG. 5B and blocks 101 and 103 of FIG. 8A show, the Y-coordinate value is adjusted and the X-coordinate value is unadjusted to produce the position coordinate pair (13180,−968) which are applied to controller 21 (FIG. 2) as position coordinates ($X_3$, $Y_3$). In a similar manner, as shown by blocks 105(FIG. 8A) and 109(FIG. 8B), the ($X_2$, $Y_2$) and ($X_1$, $Y_1$) position coordinate values are calculated to be (13736,−968) and (13736,0), respectively. These position coordinate values are then applied to controller 21 (FIG. 2), as shown by blocks 107 and 109, which moves plot head 23 to the desired coordinates. This U-shaped movement of plot head 23 to the position coordinates, as shown in FIG. 5B, causes the pen contained in plot head 23 to be deposited into station 31, station 31 being the first station found to be unoccupied.

Subsequent to the above pen-depositing operation, control is transferred from block 111 to block 113 where a test is made to determine if a pen is to be fetched from a station. At block 113, if it is determined that the data value "n" entered into RWM 13 (FIG. 2) is zero, indicating that no pen is to be fetched, then control is transferred to block 131. If, however, the data value "n" is found to be non-zero, indicating that a pen is to be fetched from station n, control is transferred to block 115. At block 115, the data value n is used as an address to access a position-coordinate value from the series of four position-coordinate values stored in ROM 19 (represented as Table 2 herein) and to calculate therefrom a position coordinate pair (X,Y) for commencing fetching operations. Position coordinate pairs that are calculated for commencing fetching operations with respect to the four stations 27, 29, 31, 33 are listed in Table 3. For example, if the value of n is two, indicating that the pen in the second station 29 is to be fetched, the coordinates (12136,0) shown in Table 3, representing ($X_1$, $Y_1$) in FIG. 5A, would be calculated and applied to controller 21 (FIG. 2), as shown by block 117. Thereafter, as FIG. 5A and blocks 119 and 121 show, the Y-coordinate value is adjusted and the X-coordinate value is unadjusted to produce the position coordinate pair, (12136,−968) which are applied to controller 21 as position coordinates ($X_2$, $Y_2$). In a similar manner, as shown by blocks 123 and 127, the ($X_3$, $Y_3$) and ($X_4$, $Y_4$) position-coordinate values are calculated to be (11580,−968) and (11580,0), respectively. These position-coordinate values are then applied to controller 21 as indicated by blocks 125 and 129. Controller 21 moves plot head 23 to the desired coordinates in the U-shaped manner shown in FIG. 5A, thereby fetching from station 29 (representing selected station n) the pen contained in the station.

Figure 8B:
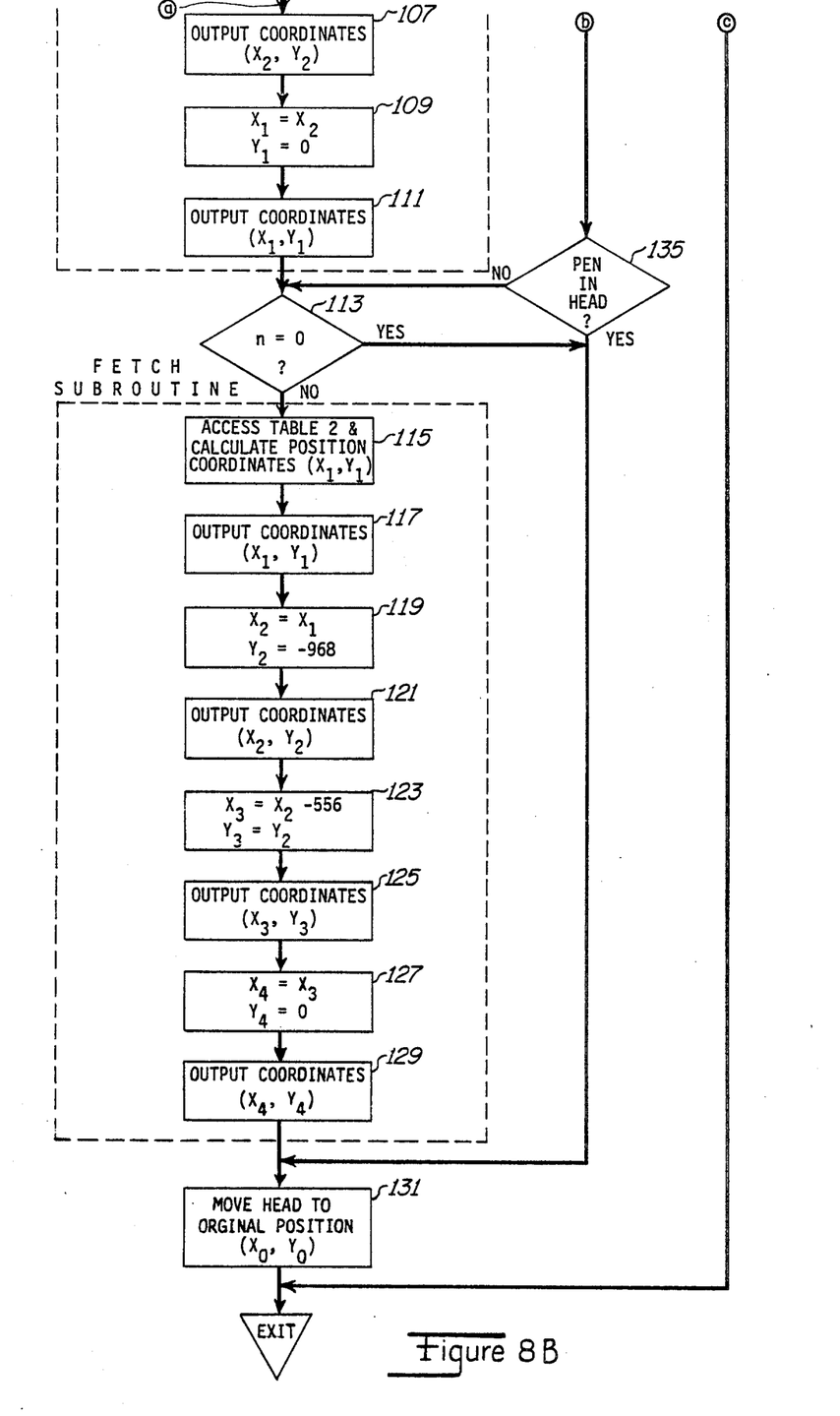

Following the operation performed at block 129, plot head 23 is returned to its original position ($X_0$, $Y_0$) as shown by block 131; this original position cooresponds to the position coordinate values previously stored in RWM 13 as indicated by block 83.

In the event all stations are occupied (full) and the data value "n" stored in RWM 13 is found to be non-zero indicating that a pen is to be fetched from station n, as shown by block 87, control is transferred to block 133. At block 133, processor 17 (FIG. 2) applies the position coordinates of pen-detector station 45 to controller 21, causing the controller 21 to move plot head 23 to the pen-detector station 45. At station 45, a sensor in the station is used as shown by block 135 to test if plot head 23 contains a pen. If plot head 23 is found not to contain a pen, then control is transferred to block 113 preparatory to moving the head to perform a fetch operation. If plot head 23 is found to contain a pen and there is no available station to receive the pen (as indicated by block 85), the head 23 is returned to its original position ($X_0$, $Y_0$) as shown by block 131. From block 131, exit is made from the routine.

The status of the plot head 23 is also checked at the time of commencement of use of the system 11 (i.e., at initialization or "power turn-on" time) by movement of the head 23 to pen-detector station 45.

We claim:

1. Apparatus having a head means for fetching a member from a repository, the apparatus comprising:
   a repository having a predetermined number of stations, each station being configured to be engaged by the head means and to store one member;
   memory means for receiving and storing applied input data values, each data value representing a selected station from which a member is to be fetched;
   processing means coupled to the memory means for providing position coordinates to which the head means is to be moved for fetching a member from the selected station;
   control means coupled to the processing means for moving the head means to the position coordinates provided by the processing means; and
   head means coupled to the control means and configured to hold at least one member and to engage the selected station and a member stored in said station for fetching the stored member by movement of the head means to the position coordinates.

2. The apparatus of claim 1 wherein said apparatus includes a means for selecting a station from which a member is to be fetched and for providing a data value representing said selected station.

3. The apparatus of claim 2 wherein the means for selecting a station is a keyboard means having a predetermined number of keys, each key being disposed for the selection of a station.

4. The apparatus of claim 1 wherein the memory means is a read-write memory disposed for receiving data and commands from at least one of the keyboard means and a data apparatus.

5. The apparatus of claim 1 wherein said apparatus also includes a means for detecting whether a member is being held by the head means.

6. The apparatus of claim 5 wherein said apparatus further includes a means for determining an available station.

7. The apparatus of claim 6 wherein the processing means includes a means for providing position coordinates to which the head means may be moved for depositing a member into an available station, the depositing being performed in response to movement of the head means relative to the position coordinates.

8. The apparatus of claim 5 wherein the detecting means includes a pen-detector station having a sensor therein for sensing the presence of a pen in the head means.

9. The apparatus of claim 1 wherein the repository includes a lever means for capping and uncapping a pen stored in a station of the repository in response to engagement of the lever means by the head means.

10. The apparatus of claim 1 wherein the processing means includes a read-only-memory with a stored routine and a digital processor coupled to the read-only-memory for producing position coordinates to which the head means is to be moved for fetching a pen from the repository.

11. A method of changing a first member held by a head means for a second member stored in a selected station of a repository, the method comprising the steps of:
depositing the first member into an unoccupied station of the repository; and
fetching the second member from the selected station of the repository, the depositing and fetching operations being performed by movement of the head means to predetermined position coordinates of the selected station.

12. The method of claim 11 where the step of depositing a member from the head means into a station of the repository includes the steps of:
detecting an unoccupied station of the repository; and
moving the head means to engage the unoccupied station.

13. The method of claim 12 where the step of depositing a member into a station of the repository further includes the step of detecting that a member is held by the head means.

14. The method of claim 13 where the step of detecting that a member is held by the head means includes the steps of:
moving the head means to a pen-detecting station; and sensing if the head means contains a member.

15. The method of claim 11 where the first and second members are pens, and the step of depositing a pen includes the step of capping the pen being deposited.

16. The method of claim 11 where the step of fetching a member from a station of a repository includes the steps of:
detecting that the station is occupied by a member; and
moving the head means to engage the occupied station.

17. The method of claim 11 where the first and second members are pens, and the steps of fetching a pen includes the step of uncapping the pen being fetched.

* * * * *

UNITED STATES PATENT AND TRADEMARK OFFICE
CERTIFICATE OF CORRECTION

PATENT NO. : 4,135,245

DATED : January 16, 1979

INVENTOR(S) : Richard Manley Kemplin, et al.

It is certified that error appears in the above-identified patent and that said Letters Patent are hereby corrected as shown below:

Table 1, Sequence No. Column, delete "1975" and insert -- 1976 --.

Table 1, Sequence No. line 1989, delete "JSM WT4SV" and insert -- JSM WT45V --.

Table 1, Sequence No. Column line 2008, delete "372003" and insert -- 072003 --.

Table 1, Sequence No. line 2009, delete "005654" and insert -- 005554 --.

Table 1, Sequence No. line 2013, delete "000015" and insert -- 000016 --.

Table 1, Sequence No. line 2018, delete "8 HAS STALL #" and insert -- B HAS STALL # --.

UNITED STATES PATENT AND TRADEMARK OFFICE
CERTIFICATE OF CORRECTION

PATENT NO. : 4,135,245

DATED : January 16, 1979

INVENTOR(S) : Richard Manley Kemplin, et al.

It is certified that error appears in the above–identified patent and that said Letters Patent are hereby corrected as shown below:

Table 1, Sequence No. line 2029, delete "027623" and insert -- 027323 --.

Table 1, Sequence No. Column, delete "022" and insert -- 2022 --.

Signed and Sealed this

Fourth Day of December 1979

[SEAL]

Attest:

SIDNEY A. DIAMOND

Attesting Officer

Commissioner of Patents and Trademarks